United States Patent
McDonald, Jr. et al.

(10) Patent No.: US 6,496,775 B2
(45) Date of Patent: Dec. 17, 2002

(54) METHOD AND APPARATUS FOR PROVIDING AUTOMATIC STATUS INFORMATION OF A DELIVERY OPERATION

(75) Inventors: Wesley E. McDonald, Jr., Herndon, VA (US); Michael D. Granruth, Centreville, VA (US)

(73) Assignee: Tracer Net Corporation, Chantilly, VA (US)

( * ) Notice: Subject to any disclaimer, the term of this patent is extended or adjusted under 35 U.S.C. 154(b) by 0 days.

(21) Appl. No.: 09/741,777

(22) Filed: Dec. 20, 2000

(65) Prior Publication Data

US 2002/0077750 A1 Jun. 20, 2002

(51) Int. Cl.⁷ .................. G06F 15/48; G06F 165/00; H04Q 7/20
(52) U.S. Cl. .................. 701/213; 701/117; 455/518; 340/993
(58) Field of Search ............... 701/117, 200, 701/213, 210, 214; 455/518, 524, 63, 67.3, 456, 517, 521; 340/993, 825.49

(56) References Cited

U.S. PATENT DOCUMENTS

| | | | | |
|---|---|---|---|---|
| 5,122,959 A | * | 6/1992 | Nathanson et al. | 364/436 |
| 5,511,233 A | * | 4/1996 | Otten | 455/56.1 |
| 6,124,810 A | * | 9/2000 | Segal et al. | 340/994 |
| 6,144,916 A | * | 11/2000 | Wood, Jr. et al. | 701/200 |
| 6,212,393 B1 | * | 4/2001 | Suarez et al. | 455/456 |
| 6,286,987 B1 | * | 9/2001 | Goode et al. | 366/60 |
| 6,301,263 B1 | * | 10/2001 | Maggenti | 370/462 |

* cited by examiner

Primary Examiner—Tan Nguyen
Assistant Examiner—Dalena Tran
(74) Attorney, Agent, or Firm—Rossi & Associates

(57) ABSTRACT

A method and apparatus for providing automatic status information pertaining to the location and delivery state of a plurality of delivery vehicles incorporates the use of an intelligent controller onboard the delivery vehicle. The onboard intelligent controller utilizes data received from a GPS receiver and a vehicle condition sensor to generate automatic status information that is transmitted by a wireless communication system to a delivery state database. The delivery state database is accessed by a central dispatch center, and the data records contained therein are utilized to provide visual indicators to a dispatcher regarding the identity, location and delivery state of each vehicle within a fleet of vehicles. The system employs knowledge of allowable states and state transitions to effect appropriate status reporting. Conceptual segmentation of delivery operations into separable state, and separation of vehicle status into allowable states, having allowable transitions between states, can be used for error detection and correction of automatically determined status.

22 Claims, 9 Drawing Sheets

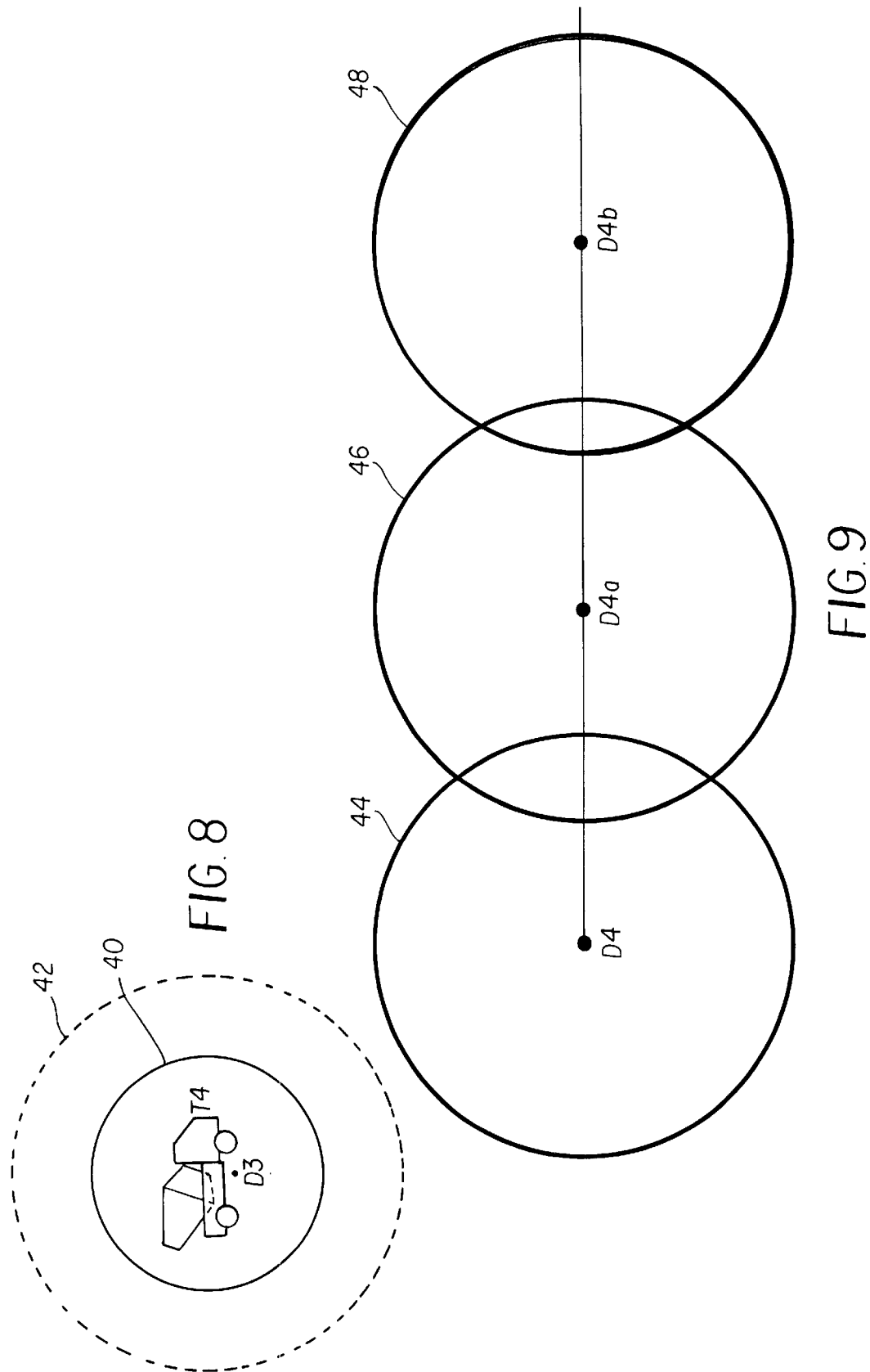

METHOD AND APPARATUS FOR PROVIDING AUTOMATIC STATUS INFORMATION OF A DELIVERY OPERATION

FIELD OF THE INVENTION

The invention relates in general to systems for providing automatic tracking of vehicles during delivery operations. More specifically, the invention relates to a method and apparatus for providing automatic status information of a delivery operation, wherein the automatic status information includes both location information and delivery state information.

BACKGROUND OF THE INVENTION

Delivery of material or goods typically involves a delivery cycle that includes a number of specific delivery states including: loading a vehicle at a terminal; driving the vehicle to a specific delivery location; unloading the vehicle; and driving the vehicle to another location to begin another delivery cycle. The expense of the delivery cycle is directly related to a dispatching operation used to direct the delivery vehicles between the various states of the delivery cycle. An efficient dispatching operation maximizes the utilization of the available vehicles within a delivery fleet to delivery the most material within a given period of time, by taking into account the delivery state of each of the vehicles in the delivery fleet with respect to the location of various loading terminals and outstanding delivery locations. Accordingly, it is recognized that efficiency in the delivery cycle is facilitated by a dispatcher having accurate knowledge of the state of the delivery process for each vehicle in the delivery fleet during each delivery cycle.

Traditional methods of providing information to dispatchers include relaying data by voice communications between drivers and the dispatchers via radio links or utilizing data entry devices, such as bar code scanners or portable computers, to have drivers enter delivery state information that is transmitted to the dispatcher. The success of such systems, however, depends on the driver manually providing accurate and timely delivery state information to the dispatcher. Drivers may be occupied, however, with various tasks during delivery operations that may interfere with the driver's ability to provide up-to-date delivery state information to the dispatcher. In the ready-mix concrete industry, for example, the driver is required to perform various tasks at the delivery site including the mixing of the concrete, participating in performing tests on the concrete, discharging the concrete from the vehicle, moving the vehicle to different discharge locations within a job site, and cleaning the vehicle after discharge. Accordingly, the driver be occupied in a manner that prevents timely notification to the dispatcher of the state of the delivery process.

In view of the above, it would be desirable to provide a method and apparatus for providing automatic status information of a delivery cycle. Further, it would be desirable to provide a method and apparatus for providing automatic status information of a delivery cycle, wherein the automatic status information includes both location information and delivery state information.

SUMMARY OF THE INVENTION

The invention provides a method and apparatus for providing automatic status information of a delivery cycle, wherein the automatic status information includes both location information and delivery state information.

Specifically, a method and apparatus for providing automatic status information pertaining to the location and delivery state of a plurality of delivery vehicles incorporates the use of an intelligent controller onboard the delivery vehicle. The onboard intelligent controller utilizes data received from a Global Positioning Satellite (GPS) receiver and at least one vehicle condition sensor to generate automatic status information that is transmitted by a wireless communication system to a delivery state database. The delivery state database is accessed by a central dispatch center, and the data records contained therein are utilized to provide visual indicators to a dispatcher regarding the identity, location and delivery state of each vehicle within a fleet of vehicles.

The system employs knowledge of allowable states and state transitions to effect appropriate status reporting. Conceptual segmentation of delivery operations into separable state, and separation of vehicle status into allowable states, having allowable transitions between states, can be used for error detection and correction of automatically determined status. Accordingly, automatic statusing is provided by the fusion of GPS data, data from the vehicle condition sensor and knowledge of the work flow or states of a desired delivery cycle.

In a preferred embodiment, a vehicle monitoring system is provided that monitors the state of a plurality of vehicles. The system includes at least one mobile data unit that generates automatic status information corresponding to a delivery vehicle, wherein the automatic status information includes position information and delivery state information, and a delivery state database that stores the automatic status information generated by the mobile data unit. A dispatch center includes a monitoring device for accessing the automatic status information stored in the delivery state database and displaying the automatic status information to provide a visual indication of the identity of the delivery vehicle, the position of the delivery vehicle and the delivery state of the delivery vehicle.

The monitoring device preferably displays the automatic status information on a display monitor in the form of an icon, wherein a display condition of the icon is varied in accordance with a delivery state defined by the delivery state information. The display condition includes at least one of the shape, color, size, contrast or display status of the icon.

The mobile data unit preferably includes a controller, a GPS receiver coupled to the controller, and at least one vehicle condition sensor coupled to the controller, wherein the controller generates the automatic status information based on signals received from the GPS receiver and the vehicle condition sensor. Specifically, the controller preferably determines the delivery state information based on the signal received from the vehicle condition sensor.

In the case of an illustrated ready-mix concrete application, the vehicle condition sensor generates a mixing barrel status signal indicative of a charge operation condition and a discharge operating condition of a mixing barrel, and wherein the controller determines a Begin Pour delivery state and an End Pour delivery state based on the mixing barrel status signal.

Regardless of the specific application employed, the delivery state information includes a plurality of delivery states that define a delivery cycle, and the controller determines whether a current delivery state is valid based on the delivery cycle. For example, the controller determines whether a current delivery state is valid based on whether a prerequisite deliver state within the delivery cycle has occurred.

The mobile data unit also preferably includes a wireless transmitter/receiver that transmits the automatic status information from the mobile data unit to the delivery state database via a wireless carrier provider coupled to the deliver state database. In addition to the automatic status information, message information can be transmitted via the transmitter/receiver from a central dispatch center to the mobile data unit and from the mobile data unit to the central dispatch center.

In a preferred embodiment, hot zone data corresponding to geographic zone around at least one of a loading terminal and a delivery site is supplied to the mobile data unit, and the controller determines the delivery state information based on the hot zone data. The controller can also alter the hot zone data in response to certain delivery states defined by the delivery state information. For example, the controller alters the hot zone data to expand the geographic zone when the delivery state information is indicative of an At Job delivery state to thereby avoid problems associated with GPS jitter. The controller also alters the hot zone data to relocate the geographic zone when the delivery state information is indicative of a change in location of a delivery site.

Other advantages and features of the invention will become apparent to those skilled in the art from the following detailed description of the preferred embodiments of the invention and the accompanying drawings.

BRIEF DESCRIPTION OF THE DRAWINGS

The invention will be described with reference to certain preferred embodiments thereof and the accompanying drawings, wherein:

FIG. 8 illustrates a method of compensating for GPS jitter in the system of FIG. 1;

FIG. 9 illustrates dynamic adjustment of hot zones associated with delivery sites in the system illustrated in FIG. 1.

DETAILED DESCRIPTION OF THE PREFERRED EMBODIMENTS

The invention will be described with reference to a system for providing automatic status information including position information and delivery state information for a fleet of ready-mix concrete deliver vehicles. It will be understood, however, that the invention is not limited to the particular application disclosed herein, but can be employed in other applications to monitor the delivery state of any type of vehicle during any type of delivery cycle.

Figure 1:
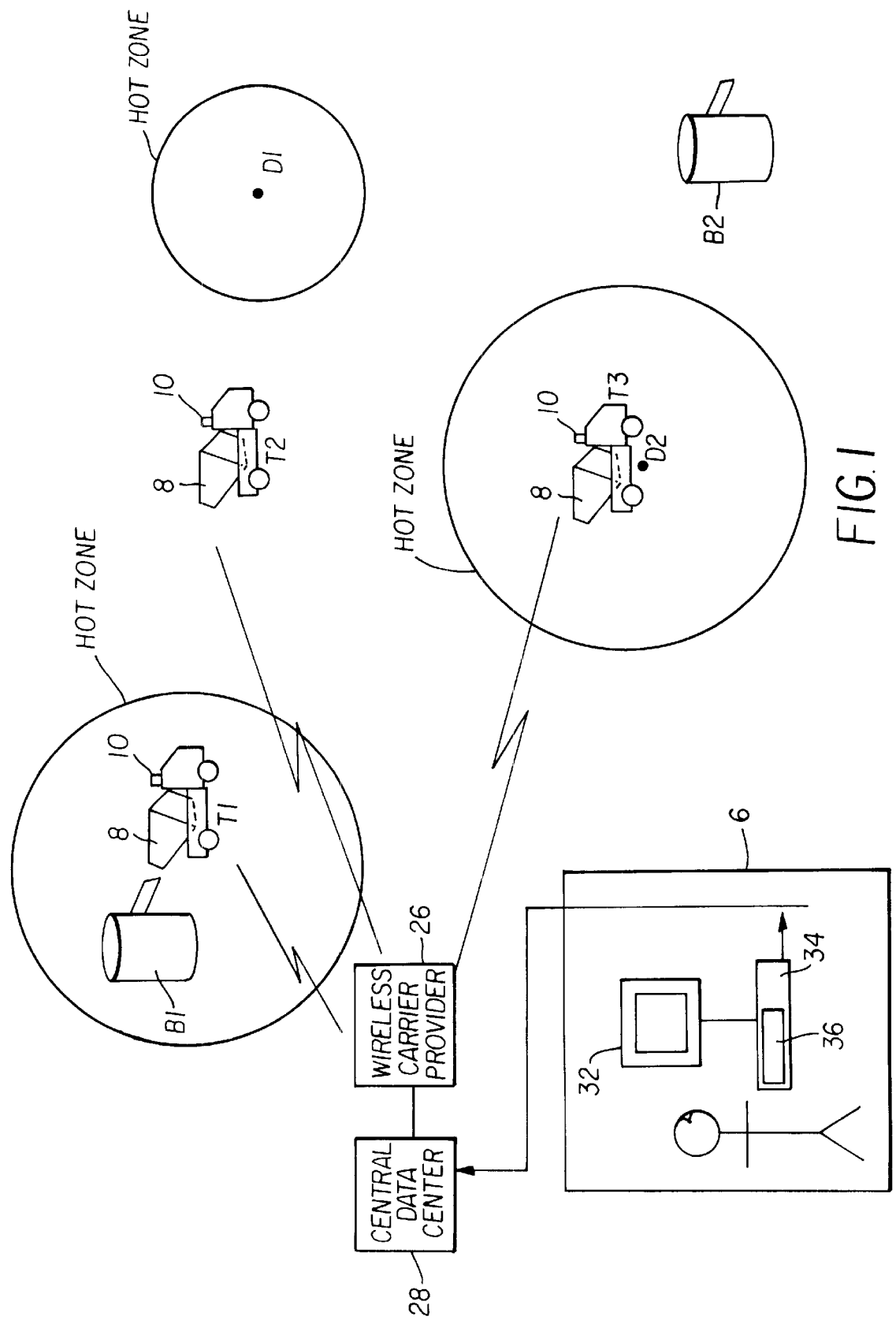
FIG. 1 is a schematic diagram of a delivery system in accordance with a preferred embodiment of the present invention.

FIG. 1 illustrates a delivery fleet of ready-mix concrete trucks T1, T2, T3 in various states of a delivery cycle between different batching terminals B1, B2 and different delivery sites D1, D2. In the illustrated example, truck T1 is located at a first batching terminal B1 to receive a load of ready-mix concrete, truck T2 is in transit from the first batching terminal B1 to a first delivery site D1 to deliver a load of ready-mix concrete, and truck T3 is located on a job at a second delivery site D2 and is in the process of delivering a load of ready-mix concrete. Movement of the trucks T1, T2, T3 between the different batching terminals B1, B2 and different delivery sites D1, D2 is coordinated by a fleet dispatcher at a central dispatch center 6, who must monitor the state of the trucks T1, T2, T3 throughout the delivery cycle to efficiently coordinate the delivery fleet.

Figure 2:
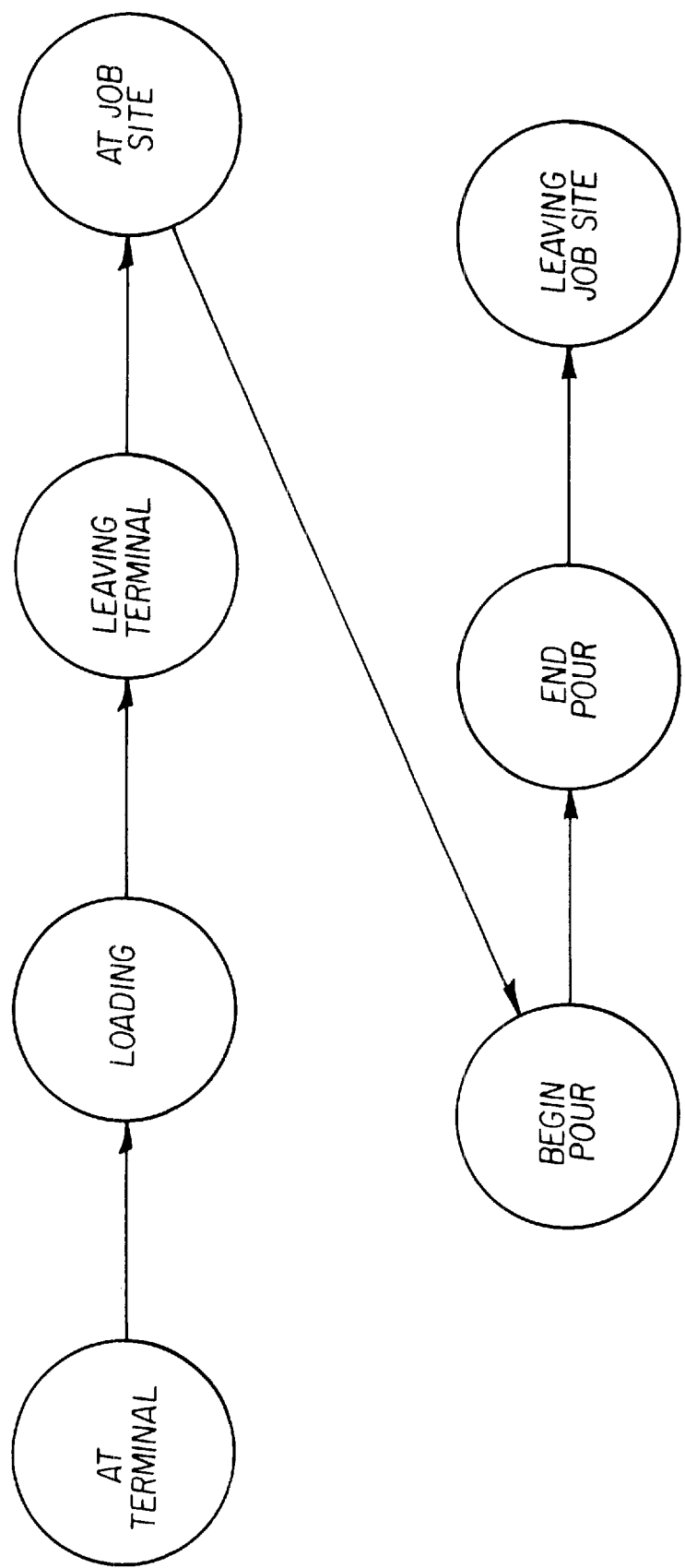
FIG. 2 illustrates a delivery cycle for a ready-mix concrete application of the type illustrated in FIG. 1.

The delivery cycle is defined based on specific delivery states of delivery vehicles during the process of loading, transit and delivery of materials. In the case of a ready-mix concrete application, the delivery cycle generally includes the delivery states of: "At Terminal"; "Loading"; "Leaving Terminal"; "At Job Site"; "Begin Pour"; "End Pour"; and "Leaving Job Site". The progression of states is strictly defined as schematically illustrated in FIG. 2. For example, a valid "Loading" state cannot take place unless a valid "At Terminal" state has occurred. As will be described in greater detail, accurate knowledge of present and past states enables automatic inference of a subsequent state.

Figure 3:
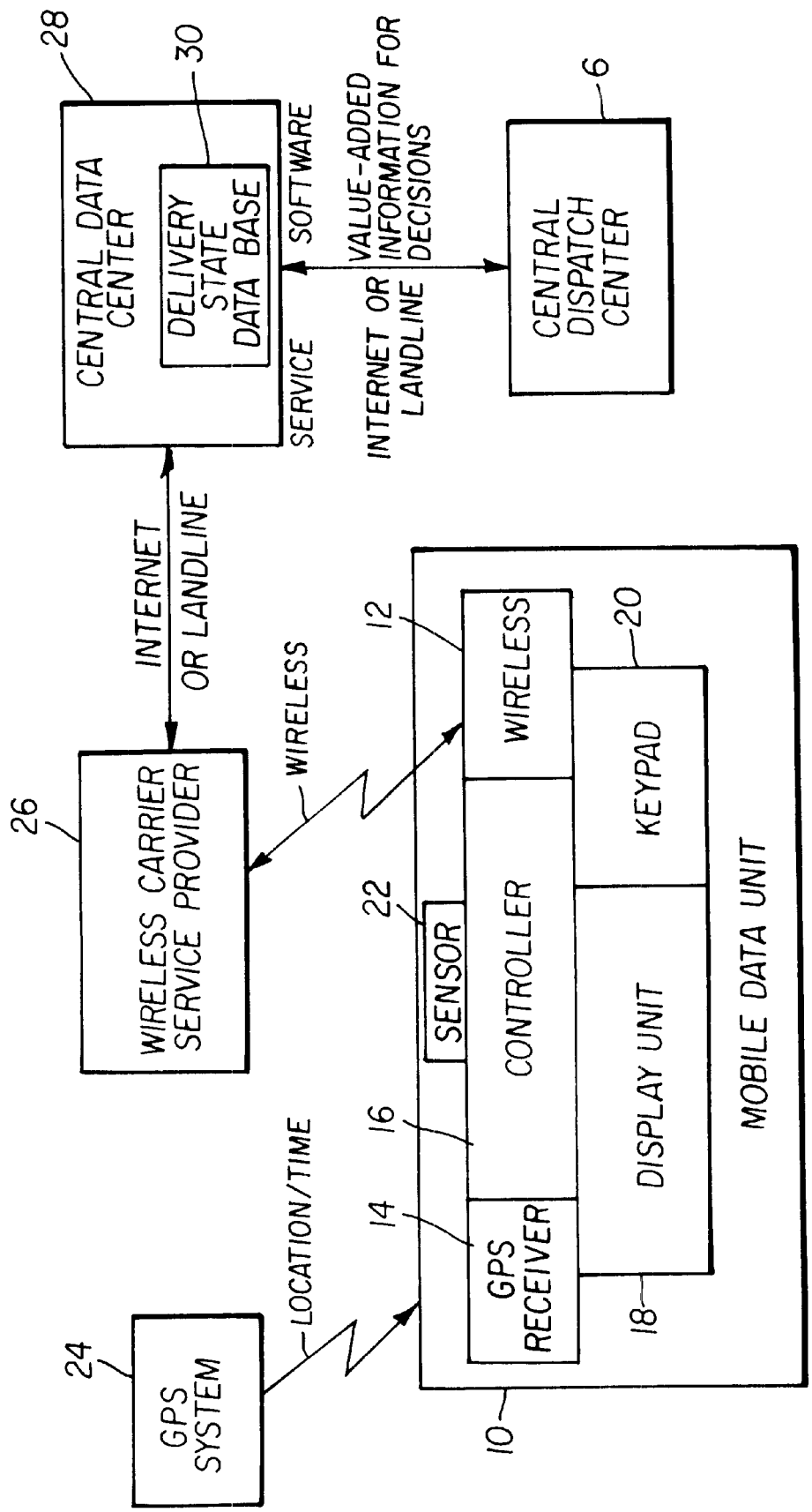
FIG. 3 is a schematic block diagram illustrating a mobile data unit utilized in the system illustrated in FIG. 1.

Referring back to FIG. 1, each of the trucks T1, T2, T3 is equipped with a mixing barrel 8, which receives ready-mix concrete at the batching terminals B1, B2 and is used to mix the ready-mix concrete during the delivery cycle. As is well known in the ready-mix concrete industry, the mixing barrel 8 is in a charge condition when rotated in a first direction and in a discharge condition when rotated in a second direction opposite to the first direction. In the charge condition, the rotation of the mixing barrel 8 causes material to be moved to a forward section of the mixing barrel 8, where the material is mixed with mixing vanes or fins located within the mixing barrel 8. The charge condition is utilized when a truck is being loaded at a batch terminal 8, when it is desirable to mix the materials contained in the mixing barrel 8 at any point during the delivery cycle, and typically after a delivery has been completed and the truck is returning from a delivery site. The discharge condition is utilized when a truck is being unloaded to discharge materials or wash water contained in the mixing barrel 8. Accordingly, an indication of a discharge condition at a job site—either alone or with other information—can be indicative of the beginning of a pour at a job site, while the indication of a charge condition after discharge—either alone or with other information—can be indicative of the ending of a pour at the job site. Each of the trucks T1, T2, T3 is also equipped with a mobile data unit 10. As shown in FIG. 3, the mobile data unit 10 includes a wireless transmitter/receiver 12 and global position satellite (GPS) receiver 14, an intelligent controller 16, a display unit 18, a data entry device 20 (for example a keypad), and at least on vehicle condition sensor 22 that monitors a condition of the truck which is indicative of a delivery state. In the illustrated embodiment, the vehicle condition sensor 22 is preferably a sensor capable of determining whether the mixing barrel 8 is operating in a charge condition or discharge condition. The GPS receiver 14 is used to determine position information based on location/time signals received from a GPS system 24, which includes an array of orbiting satellites that generate the location/time signals utilized by the GPS receiver 14 to accurately determine the longitude and latitude of the mobile data unit 10 within an accuracy of approximately ten meters. The wireless transmitter/receiver 12 is preferably utilized to transmit and receive information between the mobile data unit 10 and a wireless carrier service provider 26. Although not specifically illustrated, both the GPS receiver 14 and the wireless transmitter/receiver 12 include antenna structures. In a preferred embodiment, the antenna structure for the GPS receiver 14 and the antenna structure for the wireless transmitter/receiver 12 are incorporated as a single antenna unit. The intelligent controller 16 (implemented through the use of a general purpose microprocessor, a programmable controller, firmware, an application specific integrated circuit, associated memory or combinations thereof) generates automatic status information of a delivery-cycle, wherein the automatic status information includes both vehicle location information derived from the signals received by the GPS receiver 14 and vehicle delivery state information derived from the signals received from the vehicle condition sensor 22.

In the illustrated application, the vehicle condition sensor 22 is preferably implemented to determine the rotation direction of the mixing barrel 8, which is indicative of either a charge operating condition or a discharge operating condition. The vehicle condition sensor 22 may include sensors or sensor elements directly mounted on the mixing barrel 8 or sensors that monitor a hydraulic system on the truck that is used to rotate the mixing barrel 8. For example, a Hall effect sensor can be mounted to the frame of the truck, wherein the Hall effect sensor generates a first signal when a first sensor element mounted on the mixing barrel 8 passes the Hall effect sensor and generates a second signal when a second sensor element mounted on the mixing barrel 8 passes the Hall effect sensor. If the two sensor elements are located at any position other than 180 degrees opposite from one another, the time difference between receipt of the first signal and receipt of the second signal will vary depending on the rotation direction of the barrel 8. The difference in the time between receipt of the two signals can be used by the intelligent controller 16 to identify a charge operating condition or discharge operating condition of the mixing barrel 8. Alternatively, as stated above, one or more pressure sensors can utilized to monitor hydraulic pressure in the hydraulic system commonly used to rotate the mixing barrel 8. It will be understood, however, that rotation direction may also be determined by other mechanisms, such as a roller sensor in contact with the mixing barrel 8 or by receiving a signal from an operator control panel, and is not limited to the specific types set forth above.

In a preferred embodiment, a wireless transmission device, for example a commercial wireless carrier service provider 26 (or any other type of wireless communication link including a private radio network), is coupled to a central data center 28, which maintains a delivery state database 30 including automatic status information received from each of the trucks T1, T2, T3 during various delivery cycles. The information contained in the delivery state database 30 is accessed by a central dispatch center 6, which is provided with a display monitor 32, a processing unit 34 and a data entry device 36. The automatic status information stored in the delivery state database 30 is downloaded via a network connection (for example an Internet connection) and displayed on the display monitor 32, thereby enabling a dispatcher located at the central dispatch center 6 to receive a visual indication of the current delivery state of each of the trucks T1, T2, T3 in realtime. In addition, the complete delivery history of each of the trucks T1, T2, T3 can be accessed to permit printing of job tickets or the application of various analysis tools to analyze the automatic status information to improve the efficiency of the dispatching operation.

It should be noted that the delivery state database 30 can be maintained as part of the central dispatch center 6 or as an independent entity. As an independent entity, the delivery state database 30 may be implemented as a server that receives and stores automatic status information from a variety of different delivery fleets. Individual central dispatch centers 6 from the different delivery fleets would then access the delivery state database 30 over a network connection. In such a case, the owner of the delivery fleet would not be required to maintain the delivery state database 30, but instead, could access the delivery state database 30 to obtain the automatic status information related to the owner's delivery fleet on a subscription basis. If the delivery state database 30 is incorporated into the central dispatch center 6, the owner of the delivery fleet would have the ability to maintain complete access and control to the delivery state database 30 and the records contained therein.

In addition to accessing and receiving information from the delivery state database 30, messages can be entered via the data entry device 36 of the central dispatch center 6 and routed through the central data center 28 and wireless carrier service provider 26 for display on the display units 18 of the mobile data units 10. In order to provide a complete record of the entire delivery cycle, the messages forwarded to the mobile data units 10 are also preferably stored in the delivery state database 30. Alternatively, a direct communication link can be established between the central dispatch center 6 and the trucks T1, T2, T3 instead of routing messages through the central data center 28, although this would essentially require an unnecessary duplication of communication resources.

The overall operation of the system illustrated in FIG. 1 will now be described in greater detail to illustrate how the automatic status information supplied to the central dispatch center 6 is used to efficiently dispatch the trucks within a delivery fleet.

Figure 4:
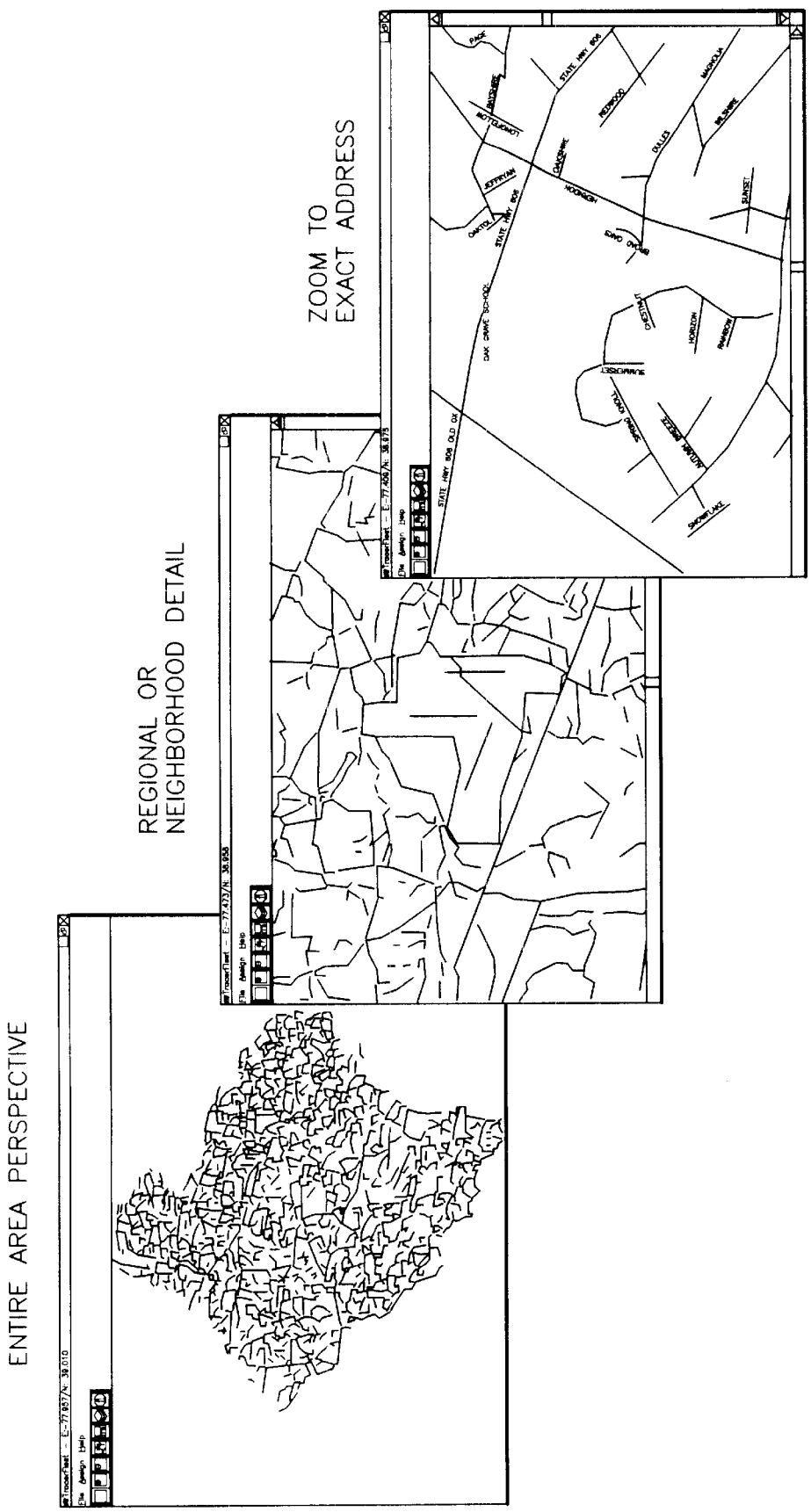
FIG. 4 illustrates display maps displayed on a display monitor of the system illustrated in FIG. 1.

Upon initiation, the mobile data unit 10 in each truck takes a position fix based on the signals received from the GPS system 26. The location of each of the trucks T1, T2, T3 is transmitted to the central dispatch center 6 for display on the display monitor 32 on overlay maps. As illustrated in FIG. 4, the processing unit 34 at the central dispatch center 6 is equipped with mapping software that enables the dispatcher to view an entire area perspective map, a regional or neighborhood detail map, or zoom to a map associated with a particular address. Mapping software that generates detailed maps of the type illustrated using GPS information is currently available through commercial vendors and commonly employed in various enterprise data systems and onboard vehicle navigation systems.

Figure 5:
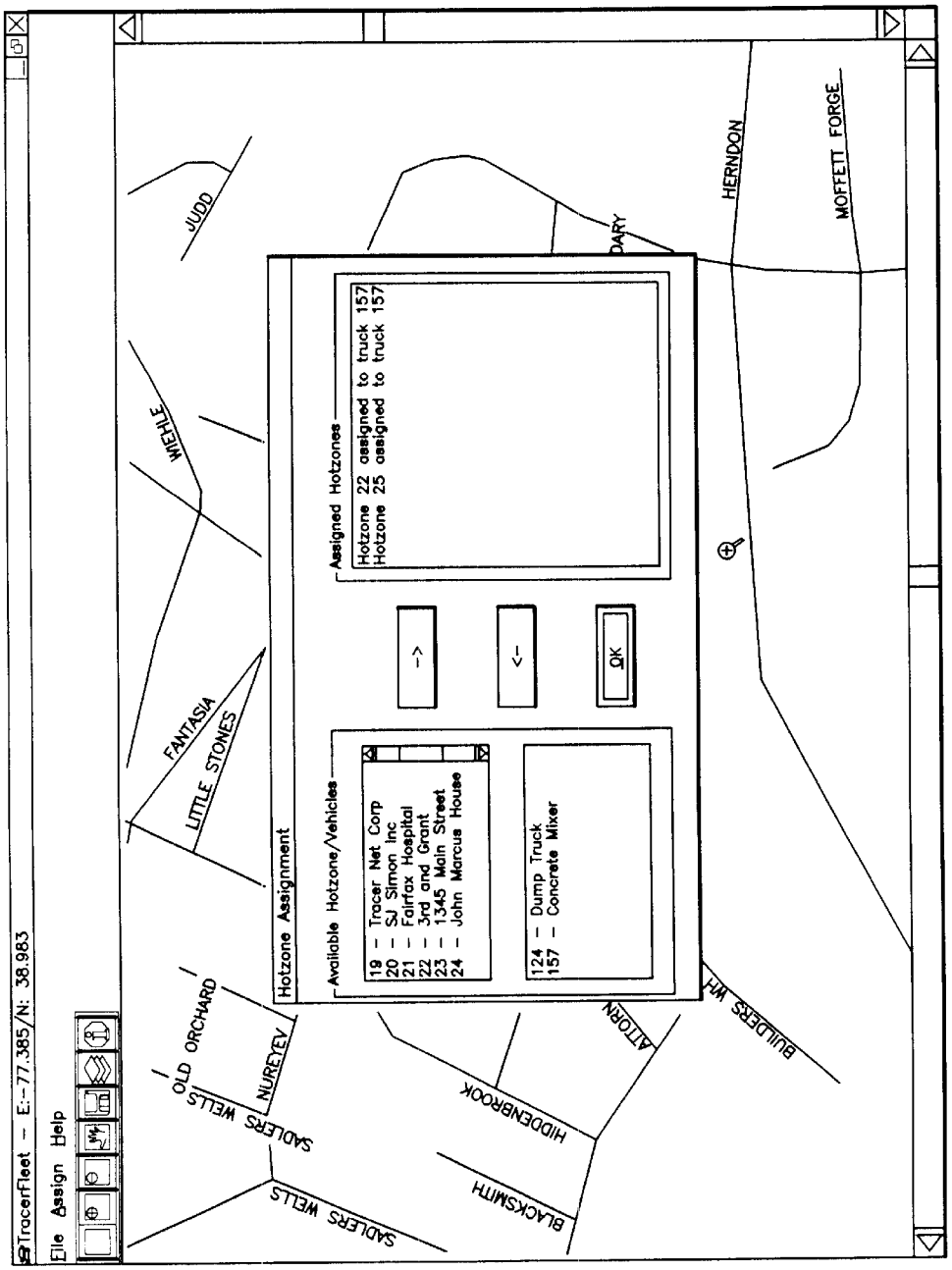
FIG. 5 illustrates a data entry interface for the system illustrated in FIG. 1.

The dispatcher can view available delivery assets (delivery vehicles) and match the delivery assets in realtime with job sites at identified locations known as "geographic fences" or "hot zones" via a point-and-click interface as shown in FIG. 5. For example, in the illustrated embodiment, the dispatcher selects a hot zone identified with a job site "22—3rd and Grant", selects a vehicle asset to be assigned to the hot zone "157—Concrete Mixer", and selects the "OK" button to assign that selected ho zone to the selected vehicle "Hot zone 22 assigned to truck 157". As will be described in greater detail, the selection causes a message to be transmitted to truck 157 to proceed to hot zone 22 associated with the job site at the street address of $3^{rd}$ and Grant.

The hot zones at job sites are created when orders are initially taken. The latitude and longitude of a particular job site is either entered directly by the dispatcher (or another operator at a different linked site that takes orders) or can be selected from a displayed map using the same point-and-click interface described above. The size and shape of the hot zone can vary and is either determined by the dispatcher or is automatically set to a predetermined condition based on the type of job. A pour at a residence might be preset to include a circular hot zone of a specific diameter, for example, while a pour for a highway might utilize a rectangular hot zone. The hot zones are downloaded to the mobile data unit 10 of each of the trucks 8 either on an as needed basis or as a complete group, and are periodically updated based on the progression of various jobs.

Figure 6:
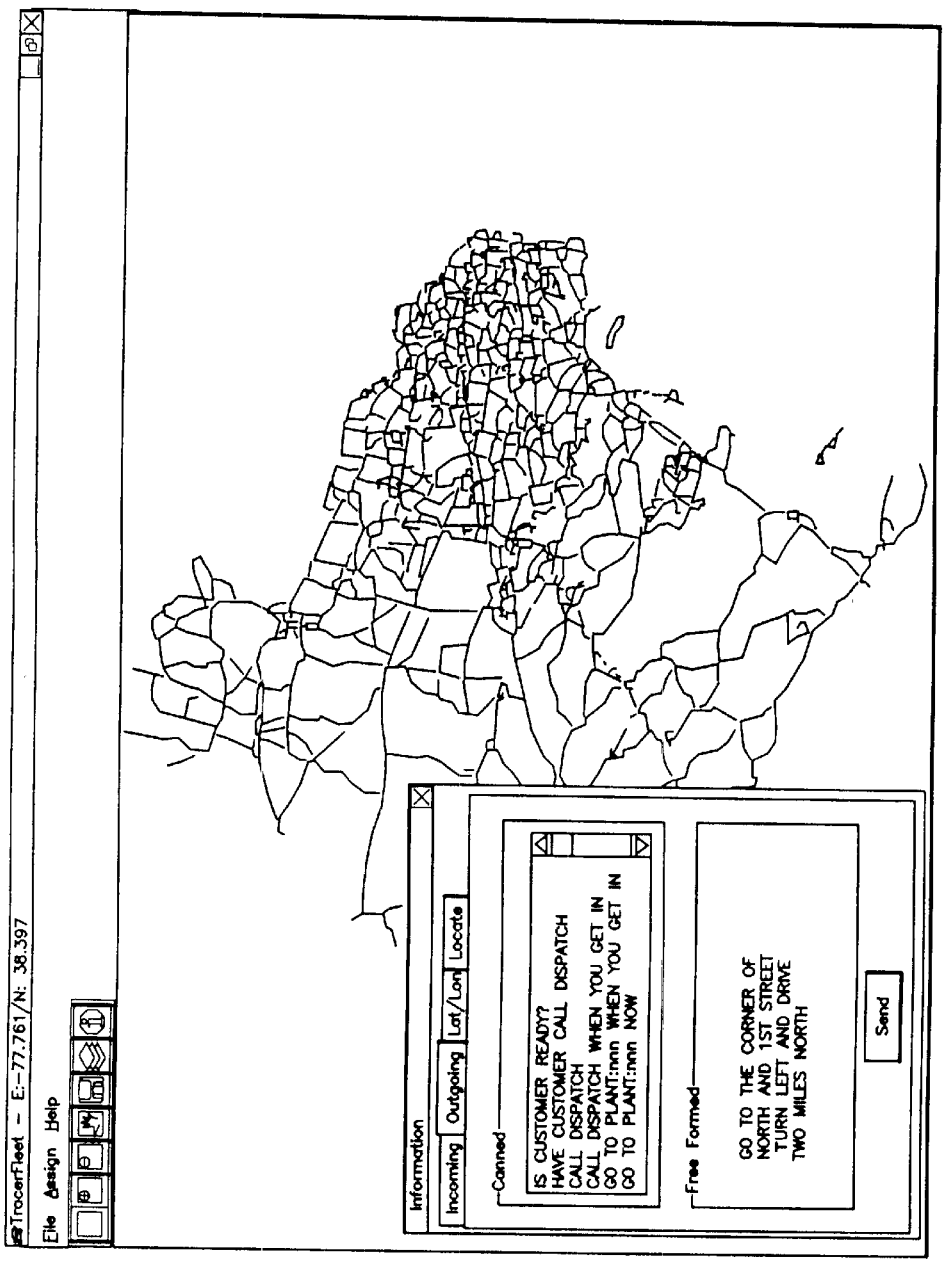
FIG. 6 illustrates a communication interface for direct communication of messages to a vehicle from a central dispatch center for a system of the type illustrated FIG. 1.

In addition, as mentioned above, the dispatcher can send a message to a particular truck within the delivery fleet. In the example illustrated in FIG. 6, a variety of "Canned" messages are provided that the dispatcher can select or the dispatcher can type in a "Free Formed" message using the data entry device 36. Messages entered by the dispatcher are displayed on the display unit 18 of the mobile data unit 10 of the selected vehicle. Accordingly, the system includes a secondary function of providing direct communication between the central dispatch center 6 and the driver, thereby allowing secondary communication links—such as conventional radio systems—to be eliminated. The dual functional nature of the system significantly reduces expenses by performing two separate functions utilizing the same basic equipment, namely, a primary function of providing automatic status information and a secondary function of providing a direct communication link are provided without requiring duplication of communication resources.

Figure 7:
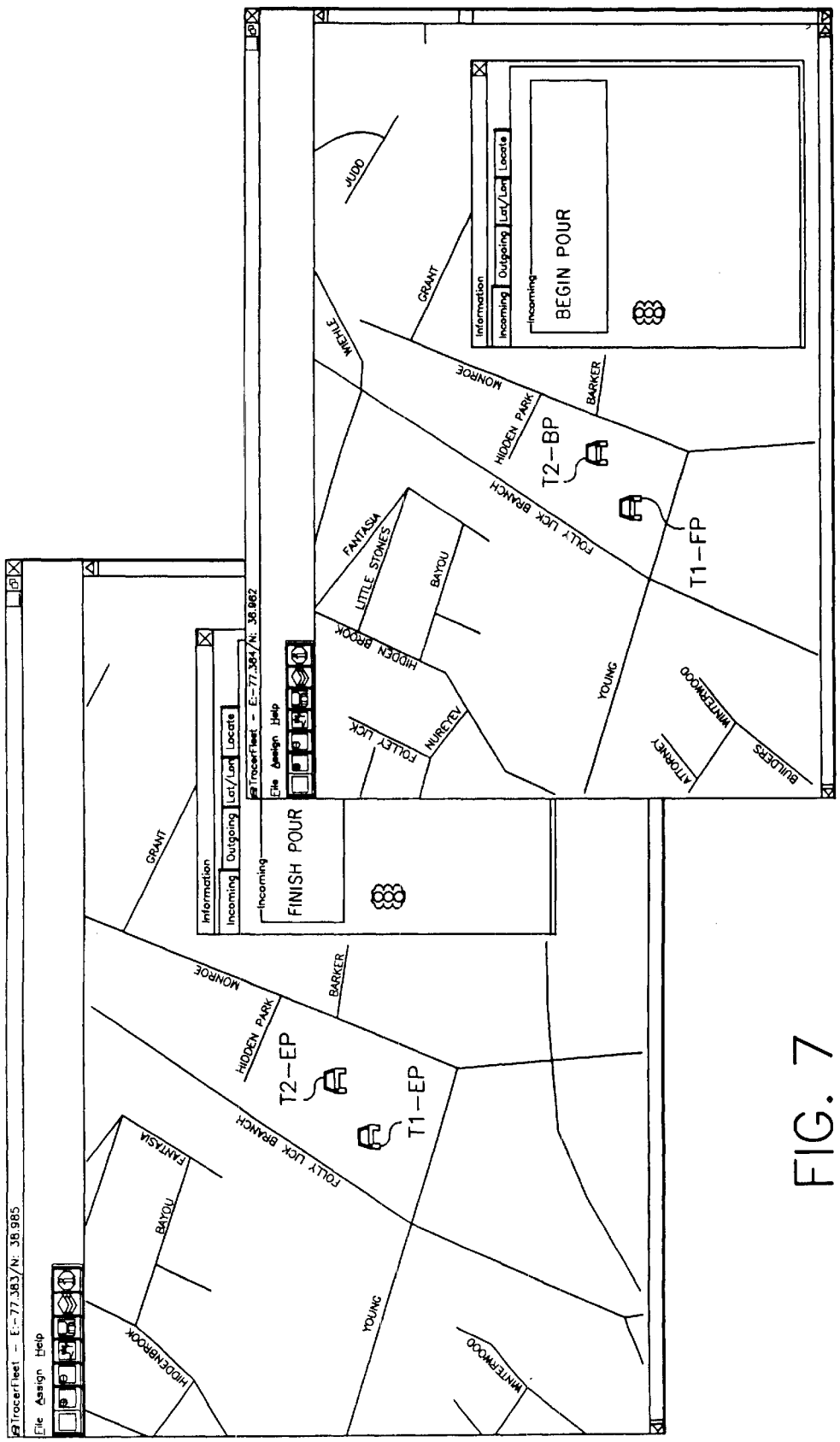
FIG. 7 illustrates icons used to identify the location and delivery state of the vehicles employed in the system of FIG. 1.

As mentioned above, the system enables a dispatcher located at the central dispatch center 6 to visually monitor the status of all vehicles in the delivery fleet in realtime. In a preferred embodiment, an icon representing the identity, location and delivery state of each truck T1, T2, T3 is displayed on the display monitor 32. For example, as shown in FIG. 7, each icon is position located on a displayed map, each icon is assigned an identification indicator corresponding to a particular truck (T1, T2), each icon is assigned a state indicator corresponding to a particular truck (example EP for "End Pour"), and each icon is displayed with a visual indicator (color, contrast or shape) that corresponds with the delivery state of the corresponding truck (dark for "End Pour" and light for "Begin Pour"). Thus, by viewing the display monitor 32 at the central dispatch center 6, a dispatcher is able to immediately view the location and identity of each and the delivery state of each delivery vehicle.

To further illustrate with reference back to FIG. 1, a dispatcher at the central dispatch center 6 enters a message to be sent to truck T1 to batch a load of concrete at batch terminal B1 and delivery the concrete to delivery site D1 using the interface illustrated in FIG. 5. The message transmitted to truck T1 preferably includes the position coordinates of the batch terminal B1 and the delivery site D1. Alternatively, the coordinates of the sites may be pre-loaded into the mobile data unit 10, in which case only an identification code for a given plant or site is provided to the mobile data unit 10. In either case, the coordinates preferably correspond to a hot zone, as described above, of a specific shape and size around each transmitted terminal and job site as shown in FIG. 1. The size of the hot zones can be varied depending on any number of factors including, for example, the type of site, and can be assigned by the central dispatch center 6 as described above or under control of the intelligent controller 16 provided in the mobile data units 10.

Once a job has been assigned to the truck T1 by the central dispatch center 6, the mobile data unit 10 monitors the location of the truck T1 with respect to the coordinates corresponding to the batch terminal B1 and delivery site D1 and their respective hot zones. As the truck T1 passes a boundary of the hot zone defined around batch terminal B1, the mobile data unit 10 sends a status message to the central data center 28 for storage in the delivery state database 30 indicating "At Terminal". As shown in the delivery cycle illustrated in FIG. 2, the "At Terminal" state is the initial state for the illustrated ready-mix concrete application. In response to the status message forwarded to the central data center 28, a delivery state record including a vehicle identification data, time date, location date and the delivery state data is stored in the delivery state database 30. The information in the delivery state record is transmitted to the central dispatch center 6 for display on the display monitor 32, thereby providing an indication to a dispatcher at the central dispatch center 6 that truck T1 has entered the batch terminal site B1. Once the vehicle condition sensor 22 senses the mixing barrel 8 is in the charge condition, the mobile data unit 10 sends a status message "Loading" to the central data center 28. Once again, a status record is created and stored in the delivery state database 30, and the information is conveyed to the dispatcher at the central dispatch center 6. When the truck T1 again passes out of the hot zone defined around the batch terminal B1, a "Leaving Terminal" status message is sent to the central data center 28. A status record is created and stored in the delivery state database 30, and the information is conveyed once again to the central dispatch center 6. In order to avoid further unnecessary repetition, it will be understood that a status record is created each time status information is transmitted to the central data center 28 and the information in the status record is conveyed to the central dispatch center 6.

It should be noted that, after the initial assignment of a job, no communication is required from the central dispatch center 6 to the truck T1. Instead, the mobile data unit 10 is able to constantly monitor the progress of truck T1 through the use of the intelligent controller 16 and inform the central dispatch center 6 when certain changes in delivery state have occurred. The feature of onboard intelligence to monitor delivery states and changes in delivery states provides a distinct advantage over systems that are required to poll the vehicle to determine its location and status, namely, communication overhead is limited to providing messages only when an actual change in delivery state occurs. The reduction of communication overhead greatly reduces communication expenses associated with cellular wireless systems and also avoids bandwidth problems associated with private direct radio link communication systems employed in various types of delivery applications.

The dispatcher, of course, may manually poll the truck T1 at any time to find out its specific location or delivery state. Alternatively, automatic polling can be conducted by the dispatch center 6 or a timer can be provided within the mobile data unit 10 to periodically update the status information automatically to the dispatch center 6 if desired. The frequency of polling is a tradeoff between the above-described advantages of reducing communication overhead and available communication resources.

Returning to the description of the delivery cycle in the illustrated embodiment, the mobile data unit 10 sends an "At Job Site" status message when the truck T1 crosses the boundary of the hot zone defined around the delivery site D1. Once the vehicle condition sensor 22 indicates the discharge condition has been entered, the mobile data unit 10 transmits a "Begin Pour" status message to the central data center 28. At that point, the dispatcher is advised that the truck T1 is at the delivery site D1 and that delivery has actually begun. Completion of delivery is indicated when the vehicle condition sensor 22 indicates the mixing barrel 8 is in the charge condition, at which time the mobile data unit 10 transmits an "End Pour" message. The mobile control unit 10 transmits a "Leaving Job Site" upon crossing the boundary of the hot zone located around the delivery site D1. At this point, or even prior to the completion of a current delivery cycle, the dispatcher can relay instructions to the truck T1 related to another delivery cycle.

As will be understood by the description provided above, the inventive system not only can provide automatic status information containing positional tracking data associated with the vehicles in a delivery fleet, but can also provide automatic status information that includes delivery state information indicative of the actual state of the delivery cycle. Accordingly, the driver need not perform any function other than those related to maneuvering the vehicle to the job site and delivering the materials. All status information is automatically provided to the central dispatch center 6 without driver interaction. Accordingly, the present system is capable of processing automatic vehicle status information to infer delivery states not indicated directly by vehicle location.

While the above described system provides the basics required to provide automatic status information, it is possible to provide refinements based on an understanding of the delivery states associated with a given delivery cycle. In the case of ready-mix concrete delivery, for example, extensive and timely automatic status information is required to enable optimal utilization of the delivery fleet. A key element of the status information is when the actual pouring of concrete commences and when the pouring is completed. Typically, charge rotation of the mixing drum 8 is maintained throughout the concrete delivery cycle except when concrete is actually discharged from the truck. Momentary discharge rotations might occur during charge operations in a process called "back spinning the drum". Other discharge cycles may occur post delivery as water is added to the drum for washout. Accordingly, relying only on discharge state in the case of a ready-mix applications may result in some false indications of delivery completion.

By appropriately applying the state information, however, it is possible to avoid the false indications. For example, it is not possible for a valid pour to take place if a truck arrives at a job site without first having been loaded at a batch terminal. Thus, recording of present and past delivery states in the delivery state database 30 enables automatic inference of a next state depending on sensor output. Further, the accuracy of the information being provided can be checked based on whether the appropriate delivery states have preceded a current delivery state.

In a further refinement, an additional vehicle condition sensor 22 may be applied that requires the above conditions logically "ANDed" to the requirement for vehicle velocity to be below some threshold. Typically this threshold must be larger than zero to account for cases where the truck is slowly moving for gutter and curb jobs. Many times during the pour, the mixing drum 8 may be stopped and moved back to a charge rotation direction. Charge alone is therefore is not a valid indication of end of pour in these types of jobs. However, the combination of charge state and vehicle velocity, for example above 2.5 mph, would indicate that the truck is moving at a velocity indicative of its return to a batch terminal. Accordingly, end pour detection preferably requires knowledge of position, present delivery state, and direction of rotation.

In view of the above, in a preferred embodiment for a valid end-pour decision, it is necessary that the following be true: 1) vehicle must have entered the hot zone; 2) vehicle must have entered a begin pour state; and 3) vehicle drum must be rotating in the charge direction. It is then sufficient that one of the following is also true: 1) vehicle is no longer in the hot zone; or 2) vehicle is moving at a velocity greater than some minimal threshold.

The last two conditions account for several typical situations. If the vehicle translates from inside the job site area to outside at a low velocity, the second condition above may not be met. By immediately advancing to end pour status upon exit from the job site area, further delay in doing so while waiting for sufficient vehicle velocity to be achieved is avoided. The second condition may occur as the vehicle moves from the pour location to a position set aside for cleanout of the chute. Proper setting of this threshold allows differentiation of movements related to curb and gutter moving pours and movement to clean out areas. The second condition also ensures that eventually, failing all else, an end pour will occur as the vehicle gains speed to return to a batch terminal.

Various methodologies can be employed to detect various states in different applications. In the application of a ready-mix concrete delivery fleet discussed herein, a preferred method of detecting Begin Pour and End Pour states includes:

Begin Pour:
1.) In a job site hot zone;
2.) Not in a terminal loading hot zone (prevents detection during charge operations which sometimes includes discharge rotations before and after loading);
3.) Velocity less than or equal to a threshold value (typically approximately zero velocity); and
4.) Drum is rotating in discharge direction.

End Pour:
1.) Must have experienced a Begin Pour state;
2.) Drum rotation is in the charge direction;
3.) Velocity greater than some threshold (typically approximately 2 mph);

In addition, the detection of the arrival in a terminal loading hot zone preferably resets the state such that the mobile data unit 10 is again looking for a Begin Pour state. Resetting based on return to a terminal loading location is useful in a case where a valid End Pour was never detected. The first and second condition set for the Begin Pour can be considered optional, although a greater likelihood and incorrect detection of a Begin Pour could result.

As the preferred detection of Begin Pour and End Pour states requires accurate velocity sensing, it is preferable to utilize a velocity filter to make sure the velocity is lower or greater than the desired thresholds. Accordingly, the mobile data unit 10 is preferably provided with a median filter (incorporated for example in the processing routine of the controller 16 or as a separate component device) although any type of low pass filter could be employed. Median filters have the additional property of removing spikes from data sets. In the instant application, a filter length of ten points with a five second sampling rate is preferably employed. Thus, if a truck is creeping along at 2 mph or so, it takes a full minute for the filter to reach 2 mph—which reduces the possibility of detecting false End Pours in gutter and curb jobs. If a truck is rapidly leaving a hot zone, 2 mph is reached quickly providing a large confidence factor that the truck not just moving for a new gutter/curb. Similarly, when the truck reaches a site, it needs to be at zero for 30 seconds of so at least before the filter will finally settle to zero for the Begin Pour.

It should be noted that operational characteristics of the GPS system 24 can cause errors in determining whether a truck is actually within a hot zone. As the accuracy of the GPS system 24 is ten meters, the intelligent controller 16 may go back and forth identifying a truck as being within or outside the hot zone if the truck stops right at the boundary of the hot zone within the operating parameters of GPS system 24. A first positional fix may indicate, for example, that the truck is one meter within the hot zone while a second position fix may indicate the truck is nine meters outside the hot zone, without the truck having actually been moved due to the inherent error in the GPS system 24. In this example, both positional fixes would fall within the accuracy of the GPS system 24, but the mobile data unit 10 would be sending conflicting signals to the central dispatch center 6 as to the status of the truck. Thus, when a truck approaches the hot zone boundary, fine positional errors within the operating allowance of the GPS system 24 may cause the apparent location of the truck to jitter about with respect to a fixed location reference. This jitter can result in repeated false detections of crossings of the truck over the hot zone boundary.

FIG. 8 illustrates one method of addressing the above-described GPS jitter problem. In the illustrated example, a truck T4 is directed to a job site D3. When the truck T4 crosses a boundary of a primary hot zone 40 located around the job site D3, the intelligent controller 16 of the mobile data unit 10 effectively enlarges the primary hot zone 40 to create a temporary enlarged hot zone 42. The size of temporary enlarged hot zone area 42 is scaled such that when truck T4 is actually within hot zone 40 or sitting on the boundary of hot zone 40, GPS system inaccuracy will not cause a false detection of truck T4 as crossing the boundary of the hot zone 40.

In other words, the above-described method expands the geographic fence or hot zone upon entry of a vehicle. The error associated with GPS positions are bounded, and may be overcome by movement greater than the worst-case position noise. As the vehicle is limited to movements at speeds commensurate with large bodies, the approach is to elastically redefine the hot zone area to be larger by some amount sufficient to put the new boundary further away from the vehicle than the apparent movements caused by positional noise. When the vehicle departs the enlarged hot zone, the elastic boundary reverts to its original size.

An alternate method to dealing with the problem of jitter is to disable position detection upon entry of a hot zone and subsequently re-enable position detection when the vehicle is clearly outside the boundary of the hot zone. If position detection is disabled once a vehicle enters a job site, confusion caused by repeated exits and reentry is avoided. The system may re-enable position detection upon completion of a delivery milestone as indicated by one or more vehicle condition sensors 22. For example, in the case of the illustrated ready-mix concrete application, the indication of a charge mode of operation and a specified velocity can be used to indicate an end pour state. Position detection is then re-enabled after the indication of an end pour state. In other application, signals from a door sensor, a seat sensor, an engine start detect sensor, etc., may be utilized to re-enable position detection. The re-enabling of position detection can either be performed by the intelligent controller 16 or remotely from the central dispatch center 6.

In addition to permitting the dynamic adjustment of a hot zone to avoid the problem associated with GPS jitter, the intelligent controller 16 can also update the hot zone position to accommodate changes in the position of the job site as the job progresses. For example, in the case of continuous pour jobs such curb construction, the exact location of the job site changes as the pouring continues. If a hot zone for a particular job is not updated, a subsequent truck sent to the job site will continue to use the original hot zone defined when the job was initiated. This may result in the subsequent truck generating an "At Job Site" status message when in fact the truck has still not reached the actual job site. In a worse case situation, the actual job site may have moved to a point outside the originally defined hot zone, such that the subsequent truck generates an "At Job Site" status message and a "Leaving Job Site" as it is driven through the originally defined hot zone to reach the actual job site location.

In order to avoid the above problem, the intelligent controller 16 monitors the state information to identify situations where it is apparent that the job site is relocated from the original job site. For example, as shown in FIG. 9, a truck is dispatched to a job site D4 having an originally defined hot zone 44. The job site D4 is actually a curb that is being continuously poured such that the exact position of where ready-mix concrete is required continues to shift along a line from position D4 to subsequent positions D4*a* and D4*b*. As a truck progresses during the pour along the line from position D4 to position D4*a*, it will exit the originally defined hot zone 44. In such a case, the intelligent controller 16 of the mobile data unit 10 would usually generate a "Leaving Job Site" status message. However, using knowledge of prior states and vehicle conditions monitored by the vehicle condition sensors 22, the intelligent controller 16 can ascertain that the job site has actually moved and the hot zone needs to be dynamically adjusted from the original hot zone 44 to a modified hot zone 46. For example, if an "At Job Site" status message was generated upon crossing into the original hot zone 44, a "Begin Pour" status message was generated prior to leaving the original hot zone 44, and position information is supplied to the intelligent controller 16 indicating that the truck is leaving the original hot zone 44 without having generated an "End Pour" status message, then a logical conclusion can be drawn that the pour is continuing and the actual job site location is moving outside the originally defined hot zone 44 to a new location (D4*a*). In this case, the intelligent controller 16 can dynamically adjust the hot zone associated with the job site to the modified hot zone 46. Similarly, if the position information supplied to the intelligent controller 16 indicates that the truck is moving outside the modified hot zone 46 without a valid "End Pour" being generated, then a logical conclusion can be drawn that the job site is continuing to move to a further location (D4*b*) and revised modified hot zone 48 is defined. If a valid "End Pour" is generated and the position data indicates the truck is leaving the revised modified hot zone 48 in a manner to generate a valid "Leaving Job Site"

status message, then the intelligent controller 16 can generate a "Revise Hot Zone" status message and forward the coordinates associated with the revised modified hot zone 48 to the central dispatch center 6 for use in subsequent delivers to the job site.

In summary, the system allows a vehicle to send automatic status information pertaining to location and delivery state to a dispatch center. An onboard intelligent controller utilizes data received from a GPS receiver and a vehicle condition sensor to generate automatic status information that is transmitted by a wireless communication system to a delivery state database. The delivery state database is utilized to provide visual indicators to a dispatcher regarding the identity, location and delivery state of each vehicle within a fleet of vehicles, thereby enabling efficient dispatching of vehicles between loading terminals and delivery sites. The system employs knowledge of allowable state and state transitions to effect appropriate status reporting. Conceptual segmentation of delivery operations into separable state, and separation of vehicle status into allowable states, having allowable transitions between states, can be used for error detection and correction of automatically determined status.

In view of the above, it will be understood that effective dispatch using automatic sensing requires distributed functions between the vehicle apparatus and those contained in the dispatch center. As both elements contribute to statusing, interactions between them are necessary. These interactions have been identified as occurring in a sequential manner including: prior delivery loop design and programming of the dispatch system and mobile data units with the delivery loop; prior identification and design of appropriate vehicle condition sensors used to sense vehicle conditions; definition of delivery locations based upon customer addresses; scheduling of delivery; assignment of vehicle to delivery location; transmitting delivery information to vehicle; automatic transmission of vehicle position and status by vehicle mounted apparatus based upon transmitted delivery information; acceptance/correction of automated status by dispatch center; and employment of delivery state information by both the dispatch center and vehicle mounted apparatus to govern allowable status states.

Figure 10:
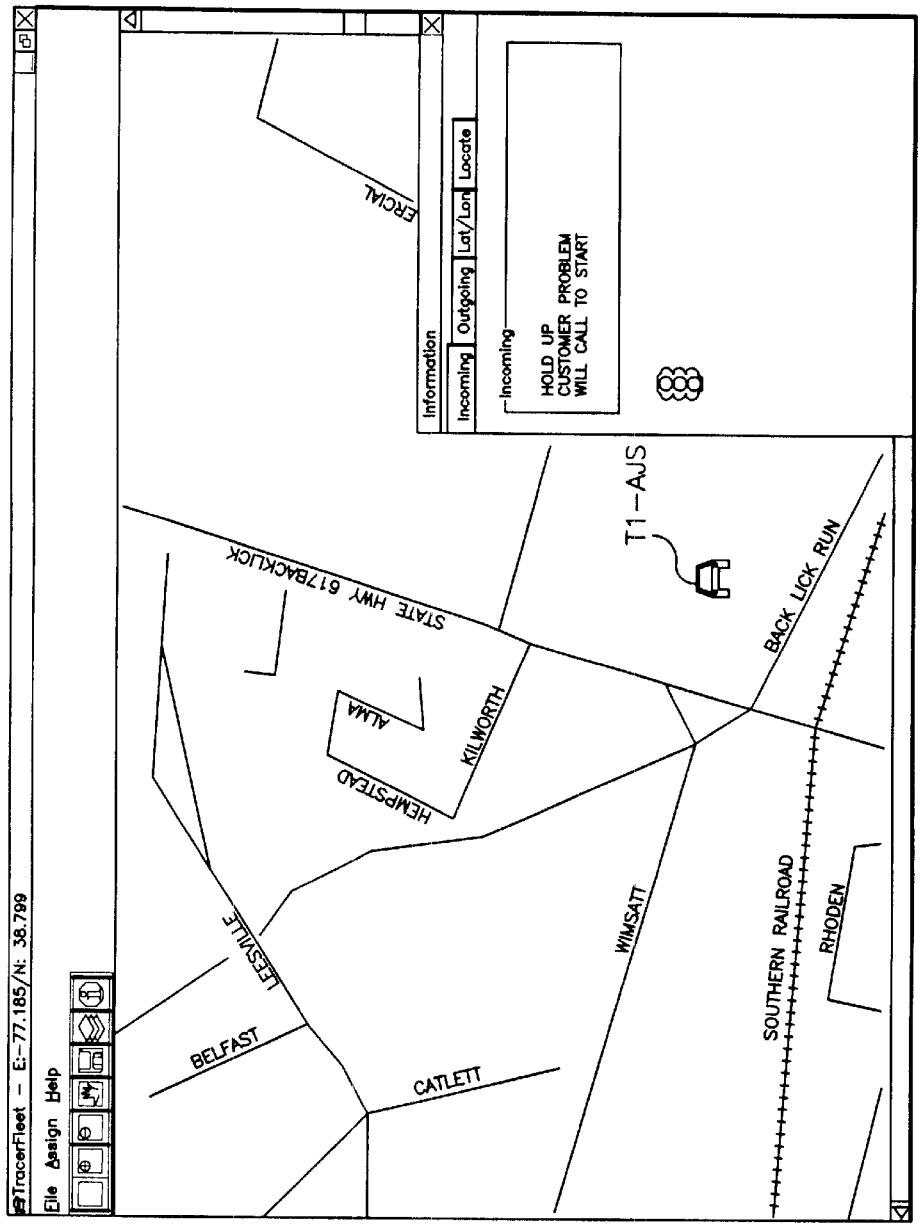
FIG. 10 illustrates a communication interface for direct communication of message to the central dispatch center from a vehicle for a system of the type illustrated in FIG. 1.

The invention has been described with reference to certain preferred embodiments thereof. Modifications and variations are possible within the scope of the appended claims. For example, any combination of the first and second methods described above to correct jitter caused by GPS system errors may be employed. Various types of vehicle conditions sensors may also be employed depending on the particular application. For example, in a dump truck application, a tail gate sensor may be employed to indicate a delivery state. Further, in tanker truck applications, a volume sensor or weight sensor may be employed to indicate a delivery state. The system is also not limited to applications in which goods are delivered in bulk state. For example, the system can be utilized in freight or package carriers where delivery states are indicated by passive tag systems that automatically monitor whether a particular package is on a vehicle. Still further, dynamic adjustment of hot zones is not limited to continuous pour jobs, but is also applicable to situations in which a number of small deliveries are being made to different closely spaced delivery sites. Still further, the ability to transmit messages is not limited to transmission from the central dispatch center 6 to the mobile data units 10, but may also include the ability of a driver to transmit messages from the mobile data unit 10 to the central dispatch center 6 using the keypad 20 provided on the mobile data unit 10. FIG. 10, for example, illustrates the receipt of an incoming message at the central dispatch center 6 from a truck T1 sitting at a job site. Still further modifications other than those specifically set forth above are possible.

What is claimed is:

1. A vehicle monitoring system that monitors the state of a plurality of vehicles, said system comprising:
   at least one mobile data unit that generates automatic status information corresponding to a delivery vehicle, wherein the automatic status information includes position information and delivery state information;
   a delivery state database that store the automatic status information generated by the mobile data unit;
   wherein the mobile data unit includes a controller, GPS receiver coupled to the controller, and at least one vehicle condition sensor coupled to the controller, and said controller generates the automatic status information based on signals received from the GPS receiver and the vehicle condition sensor;
   wherein the controller determines the delivery state information based on the signal received from the vehicle condition sensor; and
   wherein the vehicle condition sensor generates a mixing barrel status signal indicative of a charge operation condition and a discharge operating condition of a mixing barrel, and wherein the controller determines a Begin Pour delivery state and an End Pour delivery state based on the mixing barrel status signal.

2. A vehicle monitoring system as claimed in claim 1, further comprising dispatch monitoring means for accessing the automatic status information stored in the delivery state database and displaying the automatic status information to provide a visual indication of the identity of the delivery vehicle, the position of the delivery vehicle and the delivery state of the delivery vehicle.

3. A vehicle monitoring system as claimed in claim 2, wherein the dispatch monitoring means displays the automatic status information on a display monitor in the form of an icon, wherein a display condition of the icon is varied in accordance with a delivery state defined by the delivery state information.

4. A vehicle monitoring system as claimed in claim 3, wherein the display condition includes at least one of the shape, color, size, contrast or display status of the icon.

5. A vehicle monitoring system as claimed in claim 1, wherein the delivery state information includes a plurality of delivery states that define a delivery cycle, and wherein the controller determines whether a current delivery state is valid based on the delivery cycle.

6. A vehicle monitoring system as claimed in claim 5, wherein the controller determines whether a current delivery state is valid based on whether a prerequisite deliver state within the delivery cycle has occurred.

7. A vehicle monitoring system as claimed in claim 1, wherein the mobile data unit includes a wireless transmitter/receiver that transmits the automatic status information from the mobile data unit to the delivery state database via wireless transmission device coupled to the deliver state database.

8. A vehicle monitoring system as claimed in claim 7, further comprising:
   a dispatch monitoring means for accessing the automatic status information stored in the delivery state database and displaying the automatic status information to provide a visual indication of the identity of the delivery vehicle, the position of the delivery vehicle and the delivery state of the delivery vehicle; and wherein the dispatch monitoring means includes data entry means for entering messages that are transmitted to the mobile data unit via the wireless transmission device and the wireless transmitter/receiver.

9. A vehicle monitoring system as claimed in claim 8, wherein the mobile data unit includes a display unit that displays the messages transmitted to the mobile data unit from the dispatch monitoring means.

10. A vehicle monitoring system as claimed in claim 9, wherein the mobile data unit includes data entry means for entering messages that are transmitted to the dispatch monitoring means via the wireless transmitter/receiver and the wireless transmission device.

11. A vehicle monitoring system as claimed in claim 10, wherein the messages transmitted to the dispatch monitoring means from the mobile data unit and to the mobile data unit from the dispatch monitoring means are transmitted in the form of cellular digital packet data.

12. A vehicle monitoring system as claimed in claim 7, wherein the automatic status information is automatically transmitted to the delivery status database when a change in deliver state information occurs.

13. A vehicle monitoring system as claimed in claim 1, wherein hot zone data corresponding to geographic zone around at least one of a loading terminal and a delivery site is supplied to the mobile data unit, and wherein the controller determines the delivery state information based on the hot zone data.

14. A vehicle monitoring system as claimed in claim 13, wherein the controller alters the hot zone data in response to certain delivery states defined by the delivery state information.

15. A vehicle monitoring system as claimed in claim 14, wherein the controller alters the hot zone data to expand the geographic zone when the delivery state information is indicative of an At Job delivery state to thereby avoid problems associated with GPS jitter.

16. A vehicle monitoring system as claimed in claim 14, wherein the controller alters the hot zone data to relocate the geographic zone when the delivery state information is indicative of a change in location of a delivery site.

17. A vehicle monitoring system as claimed in claim 13, wherein the controller disables position detection when the delivery vehicle enters a geographic zone defined by the hot zone data to avoid problems associated with GPS jitter.

18. A vehicle monitoring system as claimed in claim 1, wherein a vehicle condition sensor is provided that generates a vehicle velocity signal, and at least one of the Begin Pour delivery state and the End Pour delivery state is determined by the controller based on the mixing barrel status signal and the vehicle velocity signal.

19. A vehicle monitoring system as claimed in claim 18, wherein the controller determines if the End Pour delivery state is valid if: a) a valid At Job state has been determined; b) a valid Begin Pour state has been determined; c) the mixing drum status signal indicates a charge condition; and d) at least one of the following conditions is true: 1) the signal received from the GPS receiver indicate the delivery vehicle is outside of a specified hot zone; or 2) the velocity signal indicates delivery vehicle is moving at a velocity greater than a predetermined minimal threshold.

20. A vehicle monitoring system as claimed in claim 18, wherein the controller determines if the Begin Pour delivery state is valid if: 1) the velocity signal indicates the delivery vehicle is moving at a velocity less than a predetermined threshold value; and 2) the mixing drum status signal indicates a discharge condition.

21. A vehicle monitoring system as claimed in claim 20, wherein the controller further determines if the Begin Pour delivery state is valid if at least one of: a) a valid At Job state is determined; and b) ) the signal received from the GPS receiver indicates the delivery vehicle is outside of a hot zone corresponding to a loading terminal.

22. A method of providing automatic status information for a plurality of delivery vehicles, wherein the automatic status information includes position information and delivery state information, said method comprising:

determining position information corresponding to each of the delivery vehicles using a GPS data;

determining delivery state information corresponding to each of the delivery vehicles using at least one vehicle condition sensor provided on each of the delivery vehicles;

transmitting the position information and delivery state information to a delivery state database via a wireless transmission network; and defining a plurality of delivery states corresponding to a delivery cycle, wherein the delivery state information comprises the delivery states;

wherein the validity of a current delivery state is determined based on whether a prerequisite deliver state has occurred; and wherein the delivery state include a Begin Pour delivery state and an End Pour delivery state associated with the delivery of ready-mix concrete.

* * * * *

(12) EX PARTE REEXAMINATION CERTIFICATE (5485th)
United States Patent
McDonald, Jr. et al.

(10) Number: US 6,496,775 C1
(45) Certificate Issued: Aug. 29, 2006

(54) METHOD AND APPARATUS FOR PROVIDING AUTOMATIC STATUS INFORMATION OF A DELIVERY OPERATION

(75) Inventors: Wesley E. McDonald, Jr., Herndon, VA (US); Michael D. Granruth, Centreville, VA (US)

(73) Assignee: Tracer Net Corporation, Chantilly, VA (US)

Reexamination Request:
No. 90/006,836, Oct. 29, 2003

Reexamination Certificate for:
Patent No.: 6,496,775
Issued: Dec. 17, 2002
Appl. No.: 09/741,777
Filed: Dec. 20, 2000

(51) Int. Cl.
*G06F 15/00* (2006.01)
*H04Q 7/20* (2006.01)

(52) U.S. Cl. .................. 701/213; 701/117; 455/518; 340/993

(58) Field of Classification Search ................ None
See application file for complete search history.

(56) References Cited

U.S. PATENT DOCUMENTS 5,122,959 A * 6/1992 Nathanson et al. ......... 701/117
5,511,233 A * 4/1996 Otten ......................... 455/524
6,124,810 A * 9/2000 Segal et al. ................. 340/994
6,144,916 A * 11/2000 Wood et al. ................ 701/200
6,212,393 B1 * 4/2001 Suarez et al. ............ 455/456.4
6,286,987 B1 * 9/2001 Goode et al. ................. 366/60
6,301,263 B1 * 10/2001 Maggenti ................... 370/462
6,611,755 B1   8/2003 Coffee et al.

* cited by examiner

*Primary Examiner*—Michael J. Zanelli

(57) ABSTRACT

A method and apparatus for providing automatic status information pertaining to the location and delivery state of a plurality of delivery vehicles incorporates the use of an intelligent controller onboard the delivery vehicle. The onboard intelligent controller utilizes data received from a GPS receiver and a vehicle condition sensor to generate automatic status information that is transmitted by a wireless communication system to a delivery state database. The delivery state database is accessed by a central dispatch center, and the data records contained therein are utilized to provide visual indicators to a dispatcher regarding the identity, location and delivery state of each vehicle within a fleet of vehicles. The system employs knowledge of allowable states and state transitions to effect approriate status reporting. Conceptual segmentation of delivery operations into separable state, and separation of vehicle status into allowable states, having allowable transitions between states, can be used for error detection and correction of automatically determined status.

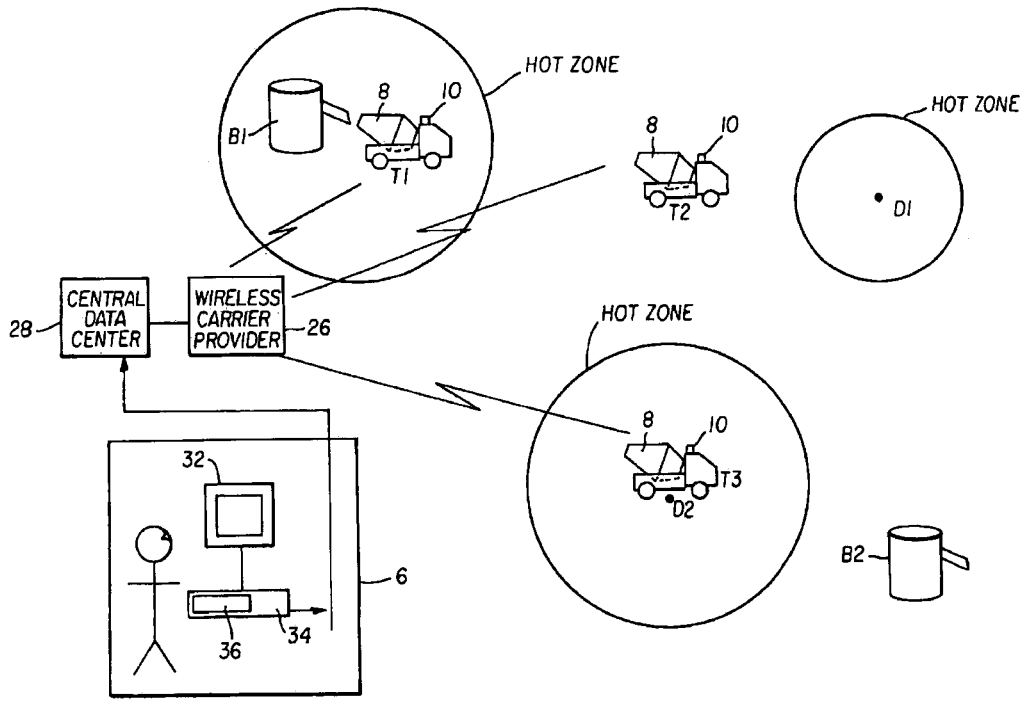

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–22 are cancelled.

\* \* \* \* \*